US012564839B2

(12) United States Patent
Zhang et al.

(10) Patent No.: US 12,564,839 B2
(45) Date of Patent: Mar. 3, 2026

(54) MICRO-COLUMN GEL CARD, SAMPLE ADDING MECHANISM AND METHOD

(71) Applicant: AIKANG MEDTECH CO., LTD, Shenzhen (CN)

(72) Inventors: Chuanguo Zhang, Shenzhen (CN); Pengfei Lai, Shenzhen (CN); Xiaoxiang Cai, Shenzhen (CN); Xueqin Wang, Shenzhen (CN); Kai Zheng, Shenzhen (CN)

(73) Assignee: AIKANG MEDTECH CO., LTD, Shenzhen (CN)

( * ) Notice: Subject to any disclaimer, the term of this patent is extended or adjusted under 35 U.S.C. 154(b) by 113 days.

(21) Appl. No.: 18/258,722

(22) PCT Filed: Mar. 11, 2022

(86) PCT No.: PCT/CN2022/080452
§ 371 (c)(1),
(2) Date: Jun. 21, 2023

(87) PCT Pub. No.: WO2023/133998
PCT Pub. Date: Jul. 20, 2023

(65) Prior Publication Data

US 2024/0375110 A1 Nov. 14, 2024

(30) Foreign Application Priority Data

Jan. 13, 2022 (CN) ......................... 202210034981.6

(51) Int. Cl.
*B01L 3/00* (2006.01)
*B01D 15/08* (2006.01)
(Continued)

(52) U.S. Cl.
CPC ......... *B01L 3/50857* (2013.01); *B01L 3/5021* (2013.01); *B01L 3/5023* (2013.01);
(Continued)

(58) Field of Classification Search
CPC .. B01L 3/50857; B01L 3/5021; B01L 3/5023; B01L 3/5025; B01L 3/50853;
(Continued)

(56) References Cited

U.S. PATENT DOCUMENTS

| | | | |
|---|---|---|---|
| 8,496,878 | B2 | 7/2013 | Jakubowicz et al. |
| 2012/0238034 | A1 | 9/2012 | Jakubowicz et al. |

FOREIGN PATENT DOCUMENTS

| | | | |
|---|---|---|---|
| CN | 101493456 | A | 7/2009 |
| CN | 102281949 | A | 12/2011 |

(Continued)

OTHER PUBLICATIONS

Extended European Search Report of EP22871110.7, Mar. 12, 2024, pp. 1-8.

(Continued)

*Primary Examiner* — Jennifer Wecker
*Assistant Examiner* — Oyeleye Alexander Alabi
(74) *Attorney, Agent, or Firm* — EVENTIDE LAW LLC

(57) ABSTRACT

Disclosed are a micro-column gel card, and a sample adding mechanism and method. The micro-column gel card includes a fixing plate and a plurality of tubular columns (3) arranged and fixed through the fixing plate. The tubular columns (3) are fixed to two sides of the fixing plate respectively, and the tubular columns (3) located on the two sides of the fixing plate are arranged in a staggered manner. Each tubular column (3) includes a sample adding cavity (301), a reaction cavity (302), and a gel column (303). The gel column (303) is configured to load a gel reagent. A central axis of the sample adding cavity (301) and a central axis of the gel column (303) do not coincide. The tubular columns (3) are designed in a double-row staggered manner.

15 Claims, 4 Drawing Sheets

(51) Int. Cl.

| | |
|---|---|
| ***B01F 33/302*** | (2022.01) |
| ***B01F 33/3033*** | (2022.01) |
| ***B01J 20/285*** | (2006.01) |
| ***B01J 20/287*** | (2006.01) |
| ***B01J 20/32*** | (2006.01) |
| ***B01L 7/00*** | (2006.01) |
| ***B01L 9/00*** | (2006.01) |
| ***B65G 47/80*** | (2006.01) |
| ***B82Y 20/00*** | (2011.01) |
| ***B82Y 30/00*** | (2011.01) |
| ***B82Y 40/00*** | (2011.01) |
| ***C08L 5/08*** | (2006.01) |
| ***C12M 1/34*** | (2006.01) |
| ***C12M 3/06*** | (2006.01) |
| ***C12N 1/14*** | (2006.01) |
| ***C12N 1/20*** | (2006.01) |
| ***C12Q 1/02*** | (2006.01) |
| ***C12Q 1/6806*** | (2018.01) |
| ***C12Q 1/6844*** | (2018.01) |
| ***C12Q 1/6848*** | (2018.01) |
| ***C12Q 1/686*** | (2018.01) |
| ***G01N 1/44*** | (2006.01) |
| ***G01N 15/10*** | (2024.01) |
| ***G01N 15/14*** | (2024.01) |
| ***G01N 15/1433*** | (2024.01) |
| ***G01N 21/29*** | (2006.01) |
| ***G01N 21/33*** | (2006.01) |
| ***G01N 21/65*** | (2006.01) |
| ***G01N 21/77*** | (2006.01) |
| ***G01N 30/02*** | (2006.01) |
| ***G01N 30/60*** | (2006.01) |
| ***G01N 30/72*** | (2006.01) |
| ***G01N 31/12*** | (2006.01) |
| ***G01N 33/543*** | (2006.01) |
| ***G01N 33/557*** | (2006.01) |
| ***G01N 33/564*** | (2006.01) |
| ***G01N 33/574*** | (2006.01) |
| ***G01N 33/58*** | (2006.01) |
| ***G01N 33/68*** | (2006.01) |
| ***G01N 35/00*** | (2006.01) |
| ***H05B 45/10*** | (2020.01) |

(52) U.S. Cl.
CPC ......... *B01L 3/5025* (2013.01); *B01L 3/50853* (2013.01); *B01L 2200/0631* (2013.01); *B01L 2200/16* (2013.01); *B01L 2300/069* (2013.01); *B01L 2400/0409* (2013.01)

(58) Field of Classification Search
CPC ......... B01L 2200/0631; B01L 2200/16; B01L 2300/069; B01L 2400/0409; B01L 3/5085
See application file for complete search history.

(56) References Cited

FOREIGN PATENT DOCUMENTS

| | | | | |
|---|---|---|---|---|
| CN | 103063853 | A | | 4/2013 |
| CN | 103166310 | A | | 6/2013 |
| CN | 203310840 | U | * | 11/2013 |
| CN | 105974147 | A | | 9/2016 |
| CN | 109342736 | A | | 2/2019 |
| CN | 109853045 | A | | 6/2019 |
| CN | 109939758 | A | | 6/2019 |
| CN | 210815316 | U | * | 6/2020 |
| CN | 212275783 | U | | 1/2021 |
| EP | 1547691 | A | | 6/2005 |
| JP | 2008224318 | A | | 9/2008 |
| TR | 2021013441 | U5 | | 12/2021 |

OTHER PUBLICATIONS

First Office Action of CN202210034981.6, Jan. 14, 2025, pp. 1-23 (including English translation based on machine translation provided by Global Dossier).
International Search Report of PCT/CN2022/080452, not yet published, pp. 1-9 (including English translation).
Written Opinion of International Searching Authority of PCT/CN2022/080452, not yet published, pp. 1-10 (including English translation).

* cited by examiner

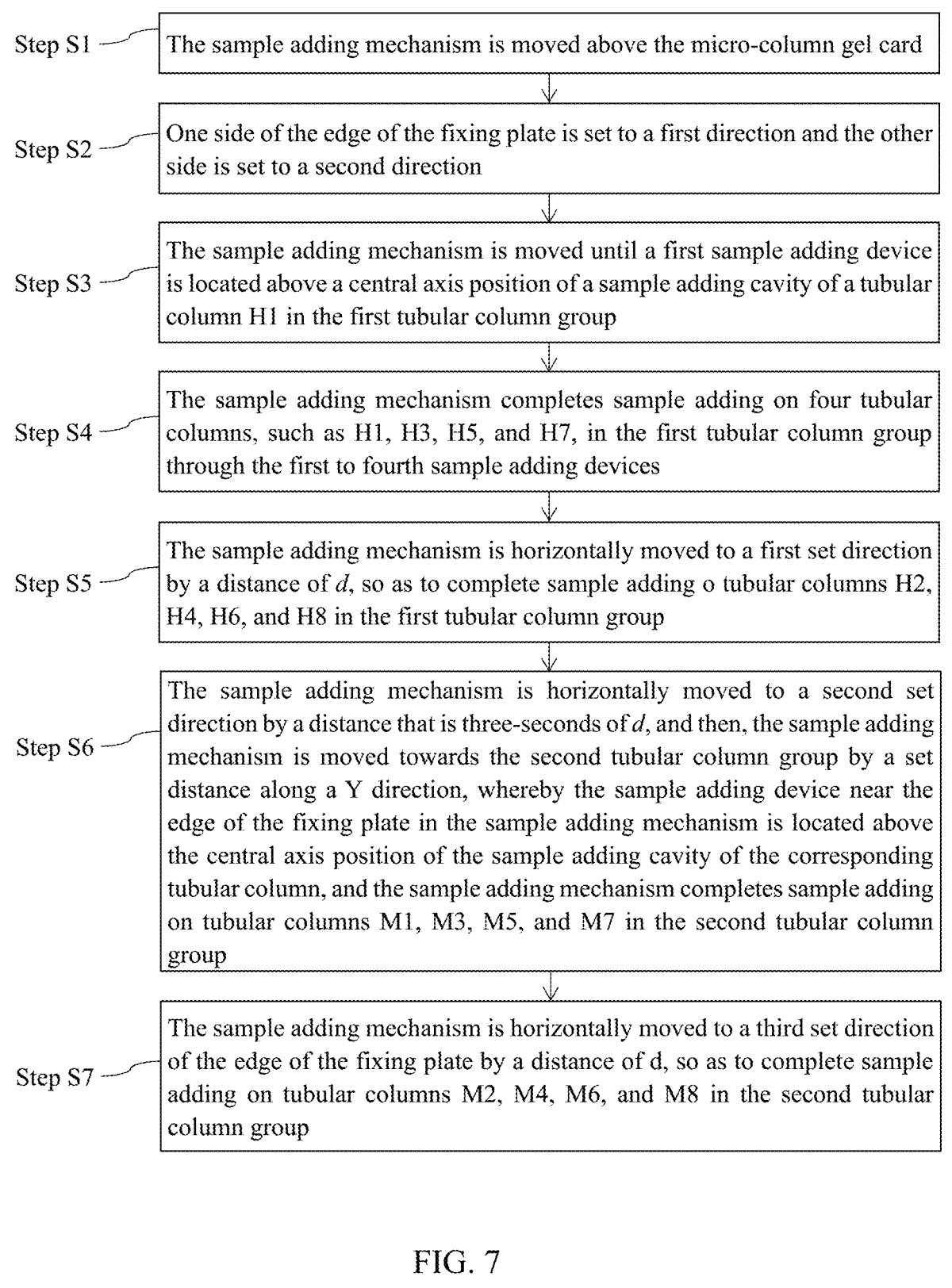

Step S1 — The sample adding mechanism is moved above the micro-column gel card

Step S2 — One side of the edge of the fixing plate is set to a first direction and the other side is set to a second direction Step S3 — The sample adding mechanism is moved until a first sample adding device is located above a central axis position of a sample adding cavity of a tubular column H1 in the first tubular column group Step S4 — The sample adding mechanism completes sample adding on four tubular columns, such as H1, H3, H5, and H7, in the first tubular column group through the first to fourth sample adding devices Step S5 — The sample adding mechanism is horizontally moved to a first set direction by a distance of *d*, so as to complete sample adding o tubular columns H2, H4, H6, and H8 in the first tubular column group Step S6 — The sample adding mechanism is horizontally moved to a second set direction by a distance that is three-seconds of *d*, and then, the sample adding mechanism is moved towards the second tubular column group by a set distance along a Y direction, whereby the sample adding device near the edge of the fixing plate in the sample adding mechanism is located above the central axis position of the sample adding cavity of the corresponding tubular column, and the sample adding mechanism completes sample adding on tubular columns M1, M3, M5, and M7 in the second tubular column group Step S7 — The sample adding mechanism is horizontally moved to a third set direction of the edge of the fixing plate by a distance of d, so as to complete sample adding on tubular columns M2, M4, M6, and M8 in the second tubular column group

FIG. 7

MICRO-COLUMN GEL CARD, SAMPLE ADDING MECHANISM AND METHOD

FIELD

The present invention relates to the field of medical devices, in particular to a micro-column gel card, a sample adding mechanism and a method.

BACKGROUND

Blood type detection technology has a history of more than 100 years, gradually developing from original classical methods, such as a slide method, a paper method, and a tube method, to a micro-titration plate method, a solid phase method, a magnetized red blood cell method, and a gel typing detection method published in 1990.

The micro-column gel method is a recommended method for a safe blood transfusion examination worldwide. As the core of the micro-column gel method, a micro-column gel card is mainly used in a blood type test before surgery and blood transfusion and screening of hemolytic disease of the newborn before or in pregnancy. A current novel card-type detection method has replaced a traditional blood detection method, becomes a new detection method that is more convenient, more stable, and more accurate, and has been widely promoted.

The micro-column gel card is generally formed by connecting a plurality of miniature tubular columns with special shapes in parallel. A sample adding column and a funnel-shaped "reaction tank" are provided above a tubular column. A miniature tubular column is provided at a lower end of the reaction tank. The miniature tubular column contains specific antibodies filled according to detection requirements of different items and non-soluble gel particles with certain physical properties and stable chemical properties. Added samples and reagents are reacted in the reaction tank first, and then are centrifuged and interpreted by an instrument.

The current micro-column gel cards are generally 6-column or 8-column. Due to limitations on the number of pore columns, the detection speed is relatively low when the micro-column gel cards are used with automated instruments. Therefore, it is urgent to improve the micro-column gel cards, so as not to affect the accuracy of detection results while improving the detection efficiency of large-scale experiments.

SUMMARY

In order to overcome the shortcomings of the prior art, the present invention provides a micro-column gel card, a sample adding mechanism, and a method.

The present invention is implemented by the following technical solutions:

A micro-column gel card, including a fixing plate and a plurality of tubular columns arranged and fixed through the fixing plate, characterized in that, the tubular columns are fixed to two sides of the fixing plate respectively, and the tubular columns located on the two sides of the fixing plate are arranged in a staggered manner, each tubular column includes a sample adding cavity, a reaction cavity, and a gel column, the gel column is configured to load a gel reagent, the sample adding cavity is provided above the gel column, the reaction cavity is connected between the sample adding cavity and the gel column, and a central axis of the sample adding cavity and a central axis of the gel column do not coincide. In this way, in this technical solution, there is a certain staggered relationship between the tubular columns distributed on two sides of the fixing plate, and any two adjacent tubular columns do not overlap, so as to ensure that the interference of interpretation between the tubular columns in the instrumental interpretation of each gel column when the micro-column gel card is used in a micro-column gel experiment is reduced, and the central axis of the sample adding cavity and the central axis of the gel column do not coincide, so as to facilitate debugging of a sample adding position.

Further, the tubular columns on the two sides of the fixing plate are in a centrosymmetric form. In this way, it is ensured that the micro-column gel card may be placed in automated equipment along all directions, thereby reducing the error rate during an actual operation.

Further, the center-to-center spacing between any two adjacent tubular columns among the tubular columns is equal, preferably, to 9 mm. In this way, in this technical feature, the center-to-center spacing between any two adjacent tubular columns is equal. That is, the center-to-center spacing between adjacent tubular columns on the same side of the fixing plate and the center-to-center spacing between adjacent tubular columns on different sides of the fixing plate are all equal, whereby the centers of three adjacent tubular columns on the two sides of the fixing plate are connected to form an equilateral triangle, in order to maintain a specific relationship between displacement distances of the sample adding device in different tubular columns and the center-to-center spacing between adjacent tubular columns when the micro-column gel card is placed in an automated instrument to perform an experiment, thereby simplifying logic control.

Further, vertical projections of the gel column and the sample adding cavity are internally tangent.

Further, any two gel columns are parallel to each other and front projections do not overlap. In this way, any two gel columns are completely non-overlapping, so as to ensure that the interference of interpretation between the tubular columns in the instrumental interpretation of each gel column when the micro-column gel card is used in a micro-column gel experiment is reduced.

Further, the sealing layer is also included, a film-covered column is provided at an opening of the sample adding cavity, the film-covered column is of an annular bulged structure, an inner ring step is provided on an inner side wall of the film-covered column and the sealing layer is in sealing connection with the film-covered column. In this way, a sealing material (such as environment friendly glue) used in sealing usually has a certain fluidity. By providing the inner ring step on the inner side wall of the film-covered column, it can be ensured that the sealing material has a certain flow space and is capable of flowing to the inner ring step without overflowing outside the sampling cavity, so as to ensure that the sealing material between the sealing layer and the film-covered column is sufficient for good adhesion.

Further, a first reinforcing rib is provided outside the sample adding cavity of each of the tubular columns, and a second reinforcing rib is provided outside the gel column of each tubular column. In this way, the first reinforcing rib and the second reinforcing rib are provided in order to make the micro-column gel card more stable structurally and less deformable.

Further, the sample adding cavity has an outer diameter of 8-10 mm, the gel column has an outer diameter of 2-4 mm and an inner diameter of 1-1.5 mm, the reaction cavity has a depth of 3-6 mm, and the gel column has a depth of 15-20 mm. In this way, the reaction effect of samples/reagents in the reaction cavity is effectively improved by controlling the ratio of pore sizes of the sample adding cavity and the gel column and the depth of the reaction cavity. When the ratio of the pore sizes of the sample adding cavity and the gel column is larger or the depth of the reaction cavity is smaller, the inclination of a conical surface of the reaction cavity is smaller, the samples/reagents are not easily spread and dispersed, and the reaction effect is affected.

Further, the two sides of the fixing plate are provided with an equal number of tubular columns, the tubular columns on one side of the fixing plate are set to a first tubular column group, the tubular columns on the other side are set to a second tubular column group, and a staggered spacing between the first tubular column group and the second tubular column group is one-half of the center-to-center spacing between adjacent tubular columns. In this way, the tubular columns on the two sides are arranged in a staggered manner at a distance of half the outer diameter of the sample adding cavity. In addition to ensuring that there is no overlap between adjacent gel columns, the lateral dimension of the whole micro-column gel card can be reduced to a large extent, and the space utilization can be improved.

Further, the fixing plate includes a lower clamp body and an upper clamp body, and a minimum distance between edges of the sample adding cavities of the tubular columns on both sides of the first tubular column group and the second tubular column group and an edge of the upper clamp body is 1-3 mm. In this way, by limiting the distance between the edges of the sample adding cavities of the tubular columns on the two sides and the edge of the fixing plate, it is convenient for a gripper of automated equipment to grasp the micro-column gel card while improving the space utilization. If the distance between the edges of the sample adding cavities of the tubular columns on the two sides and the edge of the fixing plate is too large, the size of the whole micro-column gel card is large, and the space utilization is low. If the distance between the edges of the sample adding cavities of the tubular columns on the two sides and the edge of the fixing plate is too small, the gripper of the automated equipment may have the problems of unstable grasping and falling when grasping the micro-column gel card.

Further, the first tubular column group and the second tubular column group each include N tubular columns, where N is a natural number of not less than 4, and Nis an even number.

Further, a sample adding mechanism, configured for sample adding on the foregoing micro-column gel card, the sample adding mechanism includes N/2 sample adding devices, a distance between any two adjacent sample adding devices is twice a center-to-center spacing between adjacent tubular columns, and the sample adding mechanism has a freedom of motion in X, Y, and Z directions.

Further, a method for performing, by the sample adding mechanism, sample adding on the foregoing micro-column gel card includes:

- moving the sample adding mechanism above the micro-column gel card;
- setting one side of the edge of the fixing plate to a first direction and the other side to a second direction;
- moving the sample adding mechanism until any of sample adding devices on two sides is located above a central axis position of a sample adding cavity of a tubular column near the first direction or the second direction of the edge of the fixing plate in the first tubular column group or the second tubular column group;
- completing, by the sample adding mechanism, sample adding on N/2 tubular columns in the first tubular column group or the second tubular column group through N/2 sample adding devices;
- horizontally moving the sample adding mechanism to a first set direction by a distance that is equal to one center-to-center spacing between adjacent tubular columns, so as to complete sample adding on the remaining N/2 tubular columns in the first tubular column group or the second tubular column group,
- wherein the first set direction is selected as: when the sample-added tubular column near the edge of the fixing plate in the first tubular column group or the second tubular column group is located in the first direction of the fixing plate, the set direction is the second direction, or when the sample-added tubular column near the edge of the fixing plate in the first tubular column group or the second tubular column group is located in the second direction of the fixing plate, the set direction is the first direction;
- selectively horizontally moving the sample adding mechanism to a second set direction by a distance that is one-half or three-seconds of the center-to-center spacing between adjacent tubular columns, then moving the sample adding mechanism towards the second tubular column group or the first tubular column group by a set distance along a Y direction, whereby the sample adding device near the edge of the fixing plate in the sample adding mechanism is located above the central axis position of the sample adding cavity of the corresponding tubular column, and the sample adding mechanism completes sample adding on N/2 tubular columns in the second tubular column group or the first tubular column group; and
- horizontally moving the sample adding mechanism to a third set direction of the edge of the fixing plate by a distance that is equal to one center-to-center spacing between adjacent tubular columns, so as to complete sample adding on the remaining N/2 tubular columns in the second tubular column group or the first tubular column group,
- wherein the third set direction is selected as: when the sample-added tubular column near the edge of the fixing plate in the second tubular column group or the first tubular column group is located in the first direction of the fixing plate, the set direction is the second direction, or when the sample-added tubular column near the edge of the fixing plate in the second tubular column group or the first tubular column group is located in the second direction of the fixing plate, the set direction is the first direction.

In this way, the sample adding mechanism performs sample adding in a staggered manner on the foregoing micro-column gel card according to the sample adding method, which can greatly avoid interference of simultaneous sample adding between adjacent tubular columns or possible cross-contamination problems, and the like.

Further, a sample adding mechanism, configured for sample adding on the foregoing micro-column gel card, the sample adding mechanism includes a plurality of sample adding devices in a distribution and arrangement form adapted to a distribution and arrangement form of tubular columns on the micro-column gel card, and the sample adding mechanism has a freedom of motion in X, Y, and Z directions. In this way, the sample adding mechanism may complete the sample adding process for each tubular column on the foregoing micro-column gel card at once, thereby greatly improving working efficiency.

Compared with the prior art, the present invention provides a micro-column gel card, and a sample adding mechanism and method in combination with the structural features of the present invention. The micro-column gel card includes a fixing plate and a plurality of tubular columns arranged and fixed through the fixing plate. The tubular columns are fixed to two sides of the fixing plate respectively, and the tubular columns located on the two sides of the fixing plate are arranged in a staggered manner. Each tubular column includes a sample adding cavity, a reaction cavity, and a gel column. The gel column is configured to load a gel reagent. The sample adding cavity is provided above the gel column. The reaction cavity is connected between the sample adding cavity and the gel column. A central axis of the sample adding cavity and a central axis of the gel column do not coincide. The tubular columns are designed in a double-row staggered manner. Compared with a single-row micro-column gel card of the same type, the design of the double-row tubular columns increases the number of the tubular columns to multiply the detection efficiency. Meanwhile, the staggered design of the double-row tubular columns can ensure that adjacent tubular columns do not overlap, thereby reducing mutual interference between the tubular columns in an experimental interpretation process. In addition, an eccentric design between the sample adding cavity and the gel column facilitates debugging of a sample adding position. When debugging the sample adding position of the sample adding mechanism, an operator only needs to debug the sample adding position based on a central position of the sample adding cavity, which can ensure the consistency of sample adding positions adjusted by different operators to a certain extent.

BRIEF DESCRIPTION OF THE DRAWINGS

In order to describe the embodiments of the present application or the technical solutions in the prior art more clearly, drawings required to be used in the embodiments will be briefly introduced below. Apparently, the drawings in the illustration below are only some embodiments of the present invention. Those of ordinary skill in the art also can obtain other drawings according to the provided drawings.

FIG. 7 is a flow chart of a sample adding method according to Embodiment 2 of the present invention.

Figure 1:
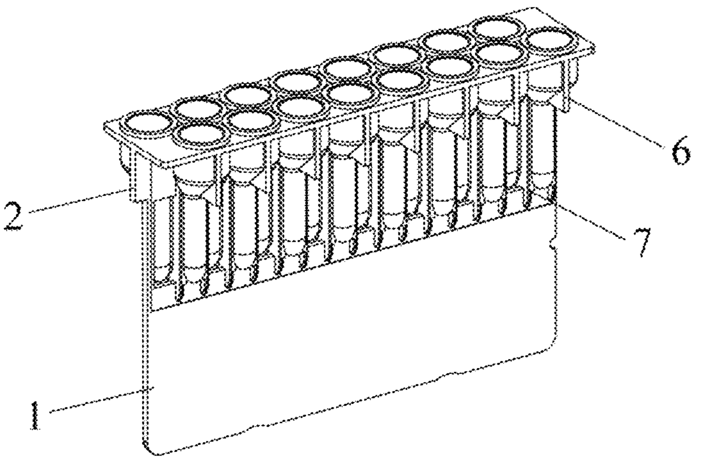
FIG. 1 is a schematic structural diagram of a micro-column gel card according to the present invention.

Reference numbers and their corresponding parts in the drawings are as follows: 1—lower clamp body, 2—upper clamp body, 3—tubular column, 301—sample adding cavity, 302—reaction cavity, 303—gel column, 4—film-covered column, 5—sample adding mechanism, 501—first sample adding device, 502—second sample adding device, 503—third sample adding device, 504—fourth sample adding device, 6—first reinforcing rib, 7—second reinforcing rib.

DETAILED DESCRIPTION

In order that the objects, technical solutions and advantages of the present invention will become more apparent, implementations of the present invention will be described hereinafter with reference to the accompanying drawings. Obviously, the described embodiments are only a part of the embodiments of the present invention, rather than all the embodiments. Based on the embodiments of the present invention, all other embodiments obtained by those of ordinary skill in the art without creative work shall fall within the scope of the present invention.

It should be noted that all directional indicators (for example, up, down, left, right, front, rear, and the like) in the embodiments of the present invention are only used to explain relative positional relationships, motion conditions and the like between components in a particular pose. If the particular pose changes, the directional indicator changes accordingly.

Embodiment 1

Figure 2:
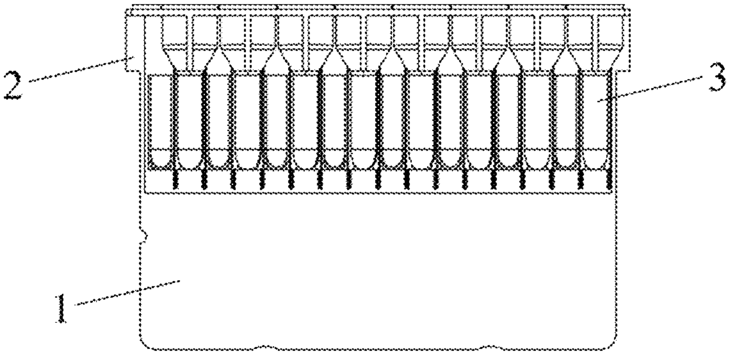
FIG. 2 is a front view of a micro-column gel card according to the present invention.
Figure 3:
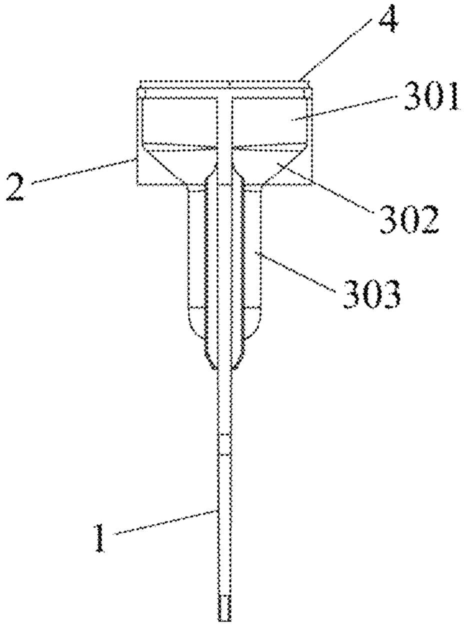
FIG. 3 is a left view of a micro-column gel card according to the present invention.

As shown in FIGS. 1 to 3, a micro-column gel card includes a fixing plate and a plurality of tubular columns 3 arranged and fixed through the fixing plate. The tubular columns are fixed to two sides of the fixing plate respectively, and the tubular columns located on the two sides of the fixing plate are arranged in a staggered manner. Each tubular column 3 includes a sample adding cavity 301, a reaction cavity 302, and a gel column 303. The gel column 303 is configured to load a gel reagent. The sample adding cavity 301 is provided above the gel column 303. The reaction cavity 302 is connected between the sample adding cavity 301 and the gel column 303. A central axis of the sample adding cavity 301 and a central axis of the gel column 303 do not coincide.

There is a certain staggered relationship between the tubular columns distributed on two sides of the fixing plate, and any two adjacent tubular columns do not overlap, so as to ensure that the interference of interpretation between the tubular columns in the instrumental interpretation of each gel column when the micro-column gel card is used in a micro-column gel experiment is reduced. In addition, when performing the micro-column gel experiment, it is necessary to first add a sample/reagent for a sufficient reaction. In order to prevent the sample/reagent from being directly injected into the gel column, it is usually necessary to inject the sample/reagent into the reaction cavity for a sufficient reaction, and then the sample/reagent is allowed to settle into the gel column through a tube wall under the action of centrifugal force. Then, the result is interpreted. However, in the existing micro-column gel cards, the sample adding cavity and the gel column are generally of a concentric design, and an operator needs to perform an appropriate offset step number based on the center of the sample adding cavity when debugging the sample adding position, whereby the sample/reagent can be filled into the reaction cavity. The specific offset can only be adjusted according to the experience of the operator. Different operators cannot keep consistent with a preset offset, resulting in uneven and poor consistency of the sample adding positions debugged by different operators. In this technical solution, the central axis of the sample adding cavity and the central axis of the gel column do not coincide. That is, there is an eccentric design between the sample adding cavity of each tubular column and the gel column. When debugging the sample adding position, the operator only needs to debug the sample adding position based on a central position of the sample adding cavity (that is, the central axis of the sample adding cavity), which can ensure the consistency of sample adding positions adjusted by different operators to a certain extent.

Embodiment 2

Figure 4:
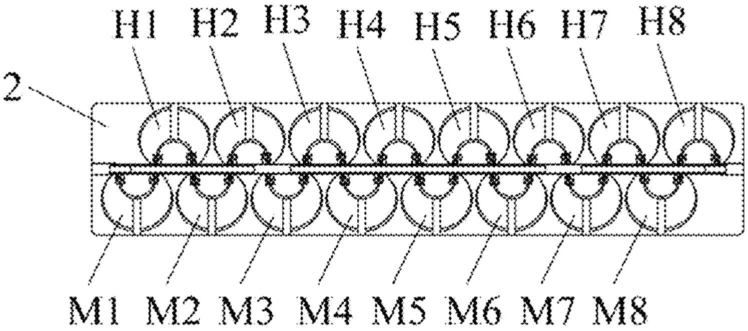
FIG. 4 is a bottom view of a micro-column gel card according to the present invention.

As shown in FIGS. 2 and 4, in one embodiment, the two sides of the fixing plate are provided with an equal number (eight) of tubular columns, so as to form a double-row sixteen-pore micro-column gel card. The tubular columns on the two sides of the fixing plate are in a centrosymmetric form. Vertical projections of the gel column and the sample adding cavity are internally tangent. Any two gel columns are parallel to each other and front projections do not overlap. The tubular columns on one side of the fixing plate are set to a first tubular column group (a column group located at the upper row shown in FIG. 4 is the first tubular column group), and the tubular columns on the other side are set to a second tubular column group (a column group located at the lower row shown in FIG. 4 is the second tubular column group). As shown in FIG. 4, the eight tubular columns in the first tubular column group are set to H1-H8 respectively, and the eight tubular columns in the second tubular column group are set to M1-M8 respectively. The center-to-center spacing between any two adjacent tubular columns is equal. A staggered spacing between the first tubular column group and the second tubular column group is one-half of the center-to-center spacing between adjacent tubular columns. In addition to ensuring that there is no overlap between adjacent gel columns, the lateral dimension of the whole micro-column gel card can be reduced to a large extent, and the space utilization can be improved. The two groups of tubular columns are in a centrosymmetric form, thereby ensuring that the micro-column gel card may be placed in automated equipment along all directions, and reducing the error rate during an actual operation. The center-to-center spacing between adjacent tubular columns is set to d. As shown in FIG. 4, the staggered spacing between H1 and M1, H2 and M2, H3 and M3, H4 and M4, H5 and M5, H6 and M6, H7 and M7, and H8 and M8 are all one-half of the center-to-center spacing between adjacent tubular columns, that is, d/2.

Figure 6:
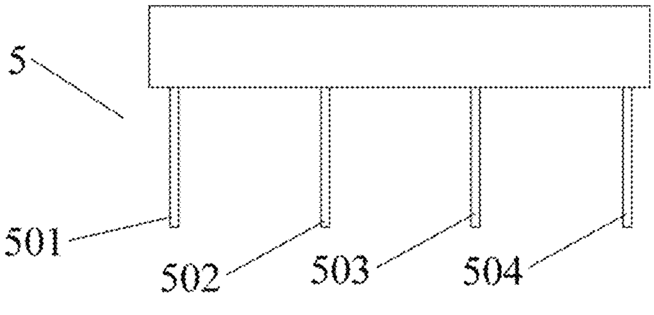
FIG. 6 is a schematic diagram of a sample adding mechanism according to Embodiment 2 of the present invention.

In this embodiment, the sample adding mechanism 5 has a freedom of motion in X, Y, and Z directions. The sample adding mechanism 5 includes four sample adding devices (FIG. 6 shows a corresponding schematic diagram, and it should be noted that FIG. 6 is a schematic diagram drawn for explaining the technical effect of this embodiment, and does not represent an actual structural relationship), which are a first sample adding device 501, a second sample adding device 502, a third sample adding device 503 and a fourth sample adding device 504, respectively. A distance between any two adjacent sample adding devices is twice a center-to-center spacing between adjacent tubular columns, that is, 2*d*. The sample adding mechanism adopts a sample adding method for the double-row sixteen-pore micro-column gel card in this embodiment as shown in FIG. 7:

S1: The sample adding mechanism is moved above the micro-column gel card.

S2: One side of the edge of the fixing plate is set to a first direction and the other side is set to a second direction.

As shown in FIG. 4, a left side of the fixing plate is set to the first direction and a right side of the fixing plate is set to the second direction.

S3: The sample adding mechanism is moved until any of sample adding devices on two sides is located above a central axis position of a sample adding cavity of a tubular column near the first direction or the second direction of the edge of the fixing plate in the first tubular column group or the second tubular column group.

As shown in FIG. 4, for example, in one implementation, the sample adding mechanism is moved until the first sample adding device 501 is located above a central axis position of a sample adding cavity of a tubular column H1 in the first tubular column group.

S4: The sample adding mechanism completes sample adding on four tubular columns, such as H1, H3, H5, and H7, in the first tubular column group through the first to fourth sample adding devices.

S5: The sample adding mechanism is horizontally moved to a first set direction by a distance of d, so as to complete sample adding on the remaining four tubular columns (that is, tubular columns H2, H4, H6, and H8) in the first tubular column group.

The first set direction is selected as: when the sample-added tubular column near the edge of the fixing plate in the first tubular column group or the second tubular column group is located in the first direction of the fixing plate, the set direction is the second direction, or when the sample-added tubular column near the edge of the fixing plate in the first tubular column group or the second tubular column group is located in the second direction of the fixing plate, the set direction is the first direction.

In this embodiment, the first direction is the left side of the fixing plate, and the second direction is the right side of the fixing plate (certainly, it is also possible to set the right side of the fixing plate to the first direction and the left side of the fixing plate to the second direction, which both fall within the scope of the present invention). The sample-added tubular column near the edge of the fixing plate in the first tubular column group is a tubular column H1. The tubular column H1 is located on the left side of the fixing plate, which is the first direction. Therefore, the first set direction is an opposite direction thereto, and the first set direction is the second direction, which is the right side of the fixing plate. Then the sample adding mechanism is horizontally moved to the right side of the fixing plate or the second direction by a distance of d, so as to complete sample adding on the remaining four tubular columns (that is, tubular columns H2, H4, H6, and H8) in the first tubular column group.

S6: The sample adding mechanism is selectively horizontally moved to a second set direction by a distance that is one-half or three-seconds of d. Then, the sample adding mechanism is moved towards the second tubular column group by a set distance along a Y direction, whereby the sample adding device near the edge of the fixing plate in the sample adding mechanism is located above the central axis position of the sample adding cavity of the corresponding tubular column, and the sample adding mechanism completes sample adding on N/2 tubular columns in the second tubular column group or the first tubular column group.

In this embodiment, when sample adding on the eight tubular columns in the first tubular column group is completed, the first to fourth sample adding devices are respectively located above the four tubular columns H2, H4, H6, and H8 in the first tubular column group. Next, sample adding is required on the second tubular column group. The sample adding mechanism is horizontally moved to a second set direction by a distance that is three-seconds of d. In this case, the second set direction is the left side of the fixing plate. Then, the sample adding mechanism is moved towards the second tubular column group by a set distance along a Y direction. The set distance in this embodiment is the distance in the Y direction between the centers of the tubular columns H1 and M1, whereby the sample adding device near the edge of the fixing plate in the sample adding mechanism is located above the central axis position of the sample adding cavity of the corresponding tubular column. That is, the first sample adding device 501 is located above the central axis position of the sample adding cavity of the tubular column M1 in the second tubular column group. Then, the sample adding mechanism completes sample adding on four tubular columns M1, M3, M5, and M7 in the second tubular column group.

S7: The sample adding mechanism is horizontally moved to a third set direction of the edge of the fixing plate by a distance of d, so as to complete sample adding on four tubular columns M2, M4, M6, and M8 in the second tubular column group.

The third set direction is selected as: when the sample-added tubular column near the edge of the fixing plate in the second tubular column group is located in the first direction of the fixing plate, the set direction is the second direction, or when the sample-added tubular column near the edge of the fixing plate in the second tubular column group or the first tubular column group is located in the second direction of the fixing plate, the set direction is the first direction.

In this embodiment, the sample-added tubular column near the edge of the fixing plate in the second tubular column group is a tubular column M1. The tubular column M1 is located on the left side of the fixing plate, which is the first direction. Therefore, the third set direction is an opposite direction thereto, and the third set direction is the second direction, which is the right side of the fixing plate. Then the sample adding mechanism is horizontally moved to the right side of the fixing plate or the second direction by a distance of d, so as to complete sample adding on the remaining four tubular columns (that is, tubular columns M2, M4, M6, and M8) in the second tubular column group.

In the solution of this embodiment, the sample adding mechanism performs sample adding in a staggered manner on the foregoing micro-column gel card according to the sample adding method, which can greatly avoid interference of simultaneous sample adding between adjacent tubular columns or possible cross-contamination problems, and the like.

Figure 5:
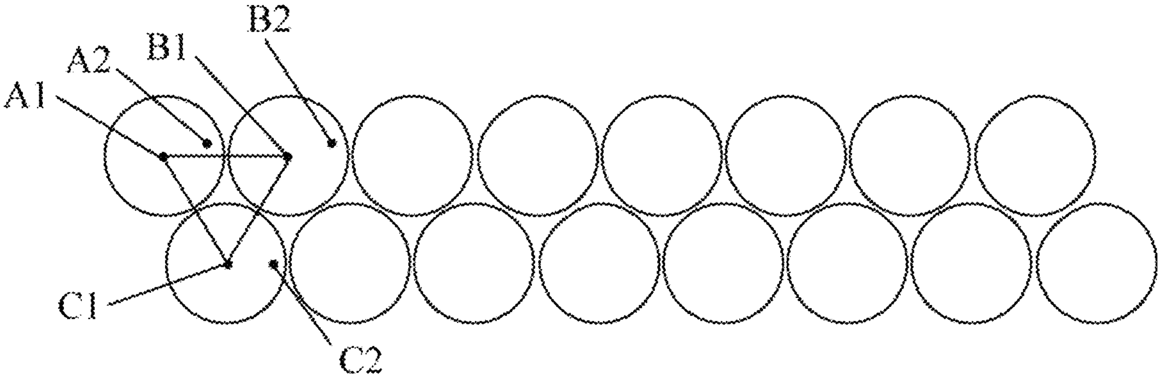
FIG. 5 is a schematic diagram of equal center-to-center spacing between adjacent tubular columns according to Embodiment 2 of the present invention.

In addition, in the solution of this embodiment, the center-to-center spacing between any two adjacent tubular columns is equal. That is, the center-to-center spacing between adjacent tubular columns on the same side of the fixing plate and the center-to-center spacing between adjacent tubular columns on different sides of the fixing plate are all equal, whereby the centers of three adjacent tubular columns on the two sides of the fixing plate are connected to form an equilateral triangle (FIG. 5 shows a corresponding schematic diagram, and it should be noted that FIG. 5 is a schematic diagram drawn for explaining the technical effect of this embodiment, and does not represent an actual structural relationship). As shown in FIG. 4, the center-to-center spacing of H1, M1, and M2 is equal, and the center-to-center spacing of H1, H2, and M2 is also equal, and so on. One-by-one descriptions will be omitted herein. A specific relationship is maintained between displacement distances of the sample adding device in different tubular columns and the center-to-center spacing between adjacent tubular columns when the micro-column gel card is placed in an automated instrument to perform an experiment, thereby simplifying logic control. That is, when the placement position of the micro-column gel card is offset or when the sample adding device is out of step, the offset of all pore positions is consistent, and the relative offset and offset range of the sample adding position are also consistent. That is, if the sample adding position is not readjusted, the position range of sample injection points on the reaction cavity of each tubular column relative to the reaction cavity is kept consistent under the displacement distance originally set. When the placement position of the micro-column gel card is offset, if the sample injection points of the sample adding device on a reaction cavity of a certain tubular column are still located within the range of the reaction cavity, it may be concluded that the sample injection points of all the tubular columns are located within the range of the reaction cavity, and it may be properly considered that the sample adding position is not readjusted. When the sample adding position needs to be adjusted, it is only necessary to use a tubular column as a sample adding position adjustment object. Specifically, as shown in the schematic diagram of FIG. 5, the sample injection points of three tubular columns shown in the diagram should be points A1, B1, and C1. When the positions of the sample injection points are offset to points A2, B2, and C2, the position ranges of points A2, B2, and C2 relative to the reaction cavities of the respective tubular columns are consistent. As shown in FIG. 5, the offset position ranges of points A2, B2, and C2 relative to the reaction cavities of the respective tubular columns are approximately 15° in a horizontal direction and the distances to the outer walls of the reaction cavities are also consistent, which all fall within the position ranges of the reaction cavities of the respective columns without exceeding.

Embodiment 3

Figure 8:
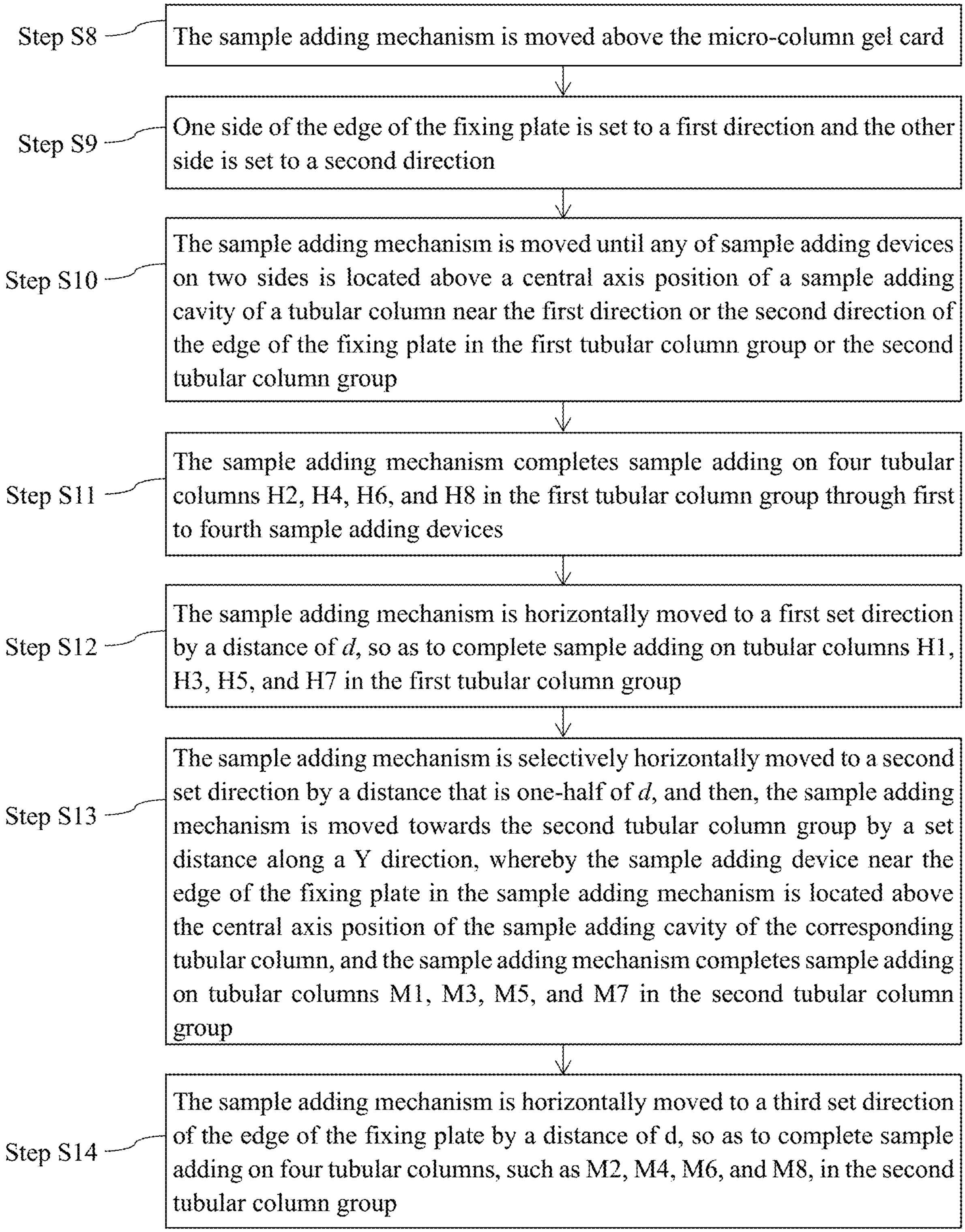
FIG. 8 is a flow chart of a sample adding method according to Embodiment 3 of the present invention.

In this embodiment, the sample adding mechanism 5 has a freedom of motion in X, Y, and Z directions. The sample adding mechanism 5 includes four sample adding devices (FIG. 6 shows a corresponding schematic diagram, and it should be noted that FIG. 6 is a schematic diagram drawn for explaining the technical effect of this embodiment, and does not represent an actual structural relationship), which are a first sample adding device 501, a second sample adding device 502, a third sample adding device 503 and a fourth sample adding device 504, respectively. A distance between any two adjacent sample adding devices is twice a center-to-center spacing between adjacent tubular columns, that is, 2*d*. The sample adding mechanism adopts a sample adding method for the double-row sixteen-pore micro-column gel card in this embodiment as shown in FIG. 8.

S8: The sample adding mechanism is moved above the micro-column gel card.

S9: One side of the edge of the fixing plate is set to a first direction and the other side is set to a second direction.

As shown in FIG. 4, a left side of the fixing plate is set to the first direction and a right side of the fixing plate is set to the second direction.

S10: The sample adding mechanism is moved until any of sample adding devices on two sides is located above a central axis position of a sample adding cavity of a tubular column near the first direction or the second direction of the edge of the fixing plate in the first tubular column group or the second tubular column group.

As shown in FIGS. 4 and 5, in this embodiment, the sample adding mechanism is moved until the fourth sample adding device 504 is located above a central axis position of a sample adding cavity of a tubular column H8 in the first tubular column group.

S11: The sample adding mechanism completes sample adding on four tubular columns H2, H4, H6, and H8 in the first tubular column group through the first to fourth sample adding devices.

S12: The sample adding mechanism is horizontally moved to a first set direction by a distance of d, so as to complete sample adding on the remaining four tubular columns (that is, tubular columns H1, H3, H5, and H7) in the first tubular column group.

The first set direction is selected as: when the sample-added tubular column near the edge of the fixing plate in the first tubular column group or the second tubular column group is located in the first direction of the fixing plate, the set direction is the second direction, or when the sample-added tubular column near the edge of the fixing plate in the first tubular column group or the second tubular column group is located in the second direction of the fixing plate, the set direction is the first direction.

In this embodiment, the first direction is the left side of the fixing plate, and the second direction is the right side of the fixing plate (certainly, it is also possible to set the right side of the fixing plate to the first direction and the left side of the fixing plate to the second direction, which both fall within the scope of the present invention). The sample-added tubular column near the edge of the fixing plate in the first tubular column group is a tubular column H8. The tubular column H8 is located on the right side of the fixing plate, which is the second direction. Therefore, the first set direction is an opposite direction thereto, and the first set direction is the first direction, which is the left side of the fixing plate. Then the sample adding mechanism is horizontally moved to the left side of the fixing plate or the first direction by a distance of d, so as to complete sample adding on the remaining four tubular columns (that is, tubular columns H1, H3, H5, and H7) in the first tubular column group.

S13: The sample adding mechanism is selectively horizontally moved to a second set direction by a distance that is one-half or three-seconds of d. Then, the sample adding mechanism is moved towards the second tubular column group by a set distance along a Y direction, whereby the sample adding device near the edge of the fixing plate in the sample adding mechanism is located above the central axis position of the sample adding cavity of the corresponding tubular column, and the sample adding mechanism completes sample adding on N/2 tubular columns in the second tubular column group or the first tubular column group.

In this embodiment, when sample adding on the eight tubular columns in the first tubular column group is completed, the first to fourth sample adding devices are respectively located above the four tubular columns H1, H3, H5, and H7 in the first tubular column group. Next, sample adding is required on the second tubular column group. The sample adding mechanism is horizontally moved to a second set direction by a distance that is one-half of d. In this case, the second set direction is the left side of the fixing plate. Then, the sample adding mechanism is moved towards the second tubular column group by a set distance along a Y direction. The set distance in this embodiment is the distance in the Y direction between the centers of the tubular columns H1 and M1, whereby the sample adding device near the edge of the fixing plate in the sample adding mechanism is located above the central axis position of the sample adding cavity of the corresponding tubular column. That is, the first sample adding device 501 is located above the central axis position of the sample adding cavity of the tubular column M1 in the second tubular column group. Then, the sample adding mechanism completes sample adding on four tubular columns M1, M3, M5, and M7 in the second tubular column group.

S14: The sample adding mechanism is horizontally moved to a third set direction of the edge of the fixing plate by a distance of d, so as to complete sample adding on four tubular columns M2, M4, M6, and M8 in the second tubular column group.

The third set direction is selected as: when the sample-added tubular column near the edge of the fixing plate in the second tubular column group is located in the first direction of the fixing plate, the set direction is the second direction, or when the sample-added tubular column near the edge of the fixing plate in the second tubular column group or the first tubular column group is located in the second direction of the fixing plate, the set direction is the first direction.

In this embodiment, the sample-added tubular column near the edge of the fixing plate in the second tubular column group is a tubular column M1. The tubular column M1 is located on the left side of the fixing plate, which is the first direction. Therefore, the third set direction is an opposite direction thereto, and the third set direction is the second direction, which is the right side of the fixing plate. Then the sample adding mechanism is horizontally moved to the right side of the fixing plate or the second direction by a distance of d, so as to complete sample adding on the remaining four tubular columns (that is, tubular columns M2, M4, M6, and M8) in the second tubular column group.

In other embodiments of S10, the sample adding mechanism may be moved first until the first sample adding device 501 is located above the central axis position of the sample adding cavity of the tubular column M1 or M8 in the second tubular column group, and the sample adding method thereof is similar to Embodiments 2 and 3, which fall within the scope of the present invention and will not be described in detail herein.

Embodiment 4

As described in Embodiment 2, the eight tubular columns in the first tubular column group are set to H1-H8, respectively, and the eight tubular columns in the second tubular column group are set to M1-M8, respectively. In this embodiment, as shown in FIGS. 1 to 3, the fixing plate includes a lower clamp body 1 and an upper clamp body 2. A minimum distance between edges of the sample adding cavities of the tubular columns on both sides of the first tubular column group and the second tubular column group and an edge of the upper clamp body is 1-3 mm. That is, the minimum distance between edges of the sample adding cavities of the tubular columns M1, H1, M8, and H8 and an edge of the upper clamp body 2 is 1-3 mm. By limiting the distance between the edges of the sample adding cavities of the tubular columns on the two sides and the edge of the fixing plate, it is convenient for a gripper of automated equipment to grasp the micro-column gel card while improving the space utilization. If the distance between the edges of the sample adding cavities of the tubular columns on the two sides and the edge of the fixing plate is too large, the size of the whole micro-column gel card is large, and the space utilization is low. If the distance between the edges of the sample adding cavities of the tubular columns on the two sides and the edge of the fixing plate is too small, the gripper of the automated equipment may have the problems of unstable grasping and falling when grasping the micro-column gel card.

Embodiment 5

In this embodiment, the sample adding mechanism includes sixteen sample adding devices (not shown) in a distribution and arrangement form adapted to a distribution and arrangement form of double-row sixteen tubular columns on the micro-column gel card. The sample adding mechanism has a freedom of motion in X, Y, and Z directions. The sample adding mechanism may complete the sample adding process for each tubular column on the foregoing micro-column gel card at once, thereby greatly improving working efficiency.

Embodiment 6

In an embodiment, the micro-column gel card further includes a sealing layer. A film-covered column 4 is provided at an opening of the sample adding cavity. The film-covered column is of an annular bulged structure. An inner ring step (not shown) is provided on an inner side wall of the film-covered column. The sealing layer is in sealing connection with the film-covered column. A sealing material (such as environment friendly glue) used in sealing usually has a certain fluidity. By providing the inner ring step on the inner side wall of the film-covered column, it can be ensured that the sealing material has a certain flow space and is capable of flowing to the inner ring step without overflowing outside the sampling cavity, so as to ensure that the sealing material between the sealing layer and the film-covered column is sufficient for good adhesion.

Embodiment 7

In an embodiment, a first reinforcing rib 6 is provided outside the sample adding cavity of each of the tubular columns, and a second reinforcing rib 7 is provided outside the gel column of each tubular column. The first reinforcing rib and the second reinforcing rib are provided in order to make the micro-column gel card more stable structurally and less deformable.

Embodiment 8

In an embodiment, the sample adding cavity 301 has an outer diameter of 8-10 mm, the gel column 303 has an outer diameter of 2-4 mm and an inner diameter of 1-1.5 mm, the reaction cavity 302 has a depth of 3-6 mm, and the gel column has a depth of 15-20 mm. The reaction effect of samples/reagents in the reaction cavity is effectively improved by controlling the ratio of pore sizes of the sample adding cavity and the gel column and the depth of the reaction cavity. When the ratio of the pore sizes of the sample adding cavity and the gel column is larger or the depth of the reaction cavity is smaller, the inclination of a conical surface of the reaction cavity is smaller, the samples/reagents are not easily spread and dispersed, and the reaction effect is affected.

The applicant hereby states that the above-described embodiments are merely illustrative of the basic principles, principal features and advantages of the present invention. It will be understood by those skilled in the art that the present invention is not limited to the foregoing embodiments. The foregoing embodiments and the specification are merely illustrative of the principles of the present invention. Those of ordinary skill in the art may also make various changes and modifications without departing from the spirit and scope of the present invention, which all fall within the scope of the present invention as claimed.

The present invention is not limited to the foregoing implementations, and it is intended that all implementations, which use a structure similar to the present invention and a method thereof to achieve the object of the present invention, fall within the scope of the present invention.

What is claimed is:

1. A micro-column gel card, comprising a fixing plate and a plurality of tubular columns arranged and fixed through the fixing plate, wherein the tubular columns are fixed to two sides of the fixing plate respectively, and the tubular columns located on the two sides of the fixing plate are arranged in a staggered manner; each tubular column comprises a sample adding cavity, a reaction cavity, and a gel column; the gel column is configured to load a gel reagent; the sample adding cavity is provided positioned above the gel column; wherein the reaction cavity is connected between the sample adding cavity and the gel column; and a central axis of the sample adding cavity and a central axis of the gel column do not coincide with each other.

2. The micro-column gel card according to claim 1, wherein the tubular columns on the two sides of the fixing plate are in a centrosymmetric form.

3. The micro-column gel card according to claim 2, wherein a center-to-center spacing between any two adjacent tubular columns among the tubular columns is equal.

4. The micro-column gel card according to claim 3, wherein the center-to-center spacing between any two adjacent tubular columns among the tubular columns is 9 mm.

5. The micro-column gel card according to claim 3, wherein vertical projections of the gel column and the sample adding cavity are internally tangent.

6. The micro-column gel card according to claim 5, wherein any two gel columns are parallel to each other and front projections do not overlap.

7. The micro-column gel card according to claim 1, further comprising a sealing layer, wherein a film-covered column is provided at an opening of the sample adding cavity, the film-covered column is of an annular bulged structure, an inner ring step is provided on an inner side wall of the film-covered column, and the sealing layer is in sealing connection with the film-covered column.

8. The micro-column gel card according to claim 1, wherein a first reinforcing rib is provided outside the sample adding cavity of each of the tubular columns, and a second reinforcing rib is provided outside the gel column of each tubular column.

9. The micro-column gel card according to claim 1, wherein the sample adding cavity has an outer diameter of 8-10 mm, the gel column has an outer diameter of 2-4 mm and an inner diameter of 1-1.5 mm, the reaction cavity has a depth of 3-6 mm, and the gel column has a depth of 15-20 mm.

10. The micro-column gel card according to claim 6, wherein the two sides of the fixing plate are provided with an equal number of tubular columns, the tubular columns on one side of the fixing plate are set to a first tubular column group, the tubular columns on the other side are set to a second tubular column group, and a staggered spacing between the first tubular column group and the second tubular column group is one-half of the center-to-center spacing between adjacent tubular columns.

11. The micro-column gel card according to claim 10, wherein the fixing plate comprises a lower clamp body and an upper clamp body, and a minimum distance between edges of the sample adding cavities of the tubular columns on both sides of the first tubular column group and the second tubular column group and an edge of the upper clamp body is 1-3 mm.

12. The micro-column gel card according to claim 10, wherein the first tubular column group and the second tubular column group each comprise N tubular columns, N being a natural number of not less than 4 and N being an even number.

13. A micro-column gel card device comprising the micro-column gel card according to claim 12, and a sample adding mechanism for sample adding on the micro-column gel card, wherein the sample adding mechanism comprises N/2 sample adding devices, a distance between any two adjacent sample adding devices is twice a center-to-center spacing between adjacent tubular columns, and the sample adding mechanism has a freedom of motion in X, Y, and Z directions.

14. A sample adding method for the micro-column gel card device according to claim 13, the method comprising:

moving the sample adding mechanism above the micro-column gel card;

setting one side of the edge of the fixing plate to a first direction and the other side to a second direction;

moving the sample adding mechanism until any of sample adding devices on two sides is located above a central axis position of a sample adding cavity of a tubular column near the first direction or the second direction of the edge of the fixing plate in the first tubular column group or the second tubular column group;

completing, by the sample adding mechanism, sample adding on N/2 tubular columns in the first tubular column group or the second tubular column group through N/2 sample adding devices;

horizontally moving the sample adding mechanism to a first set direction by a distance that is equal to one center-to-center spacing between adjacent tubular columns, so as to complete sample adding on the remaining N/2 tubular columns in the first tubular column group or the second tubular column group, wherein the first set direction is selected as: when the sample-added tubular column near the edge of the fixing plate in the first tubular column group or the second tubular column group is located in the first direction of the fixing plate, the set direction is the second direction, or when the sample-added tubular column near the edge of the fixing plate in the first tubular column group or the second tubular column group is located in the second direction of the fixing plate, the set direction is the first direction;

selectively horizontally moving the sample adding mechanism to a second set direction by a distance that is one-half or three-seconds of the center-to-center spacing between adjacent tubular columns, then moving the sample adding mechanism towards the second tubular column group or the first tubular column group by a set distance along a Y direction, whereby the sample adding device near the edge of the fixing plate in the sample adding mechanism is located above the central axis position of the sample adding cavity of the corresponding tubular column, and the sample adding mechanism completes sample adding on N/2 tubular columns in the second tubular column group or the first tubular column group; and horizontally moving the sample adding mechanism to a third set direction of the edge of the fixing plate by a distance that is equal to one center-to-center spacing between adjacent tubular columns, so as to complete sample adding on the remaining N/2 tubular columns in the second tubular column group or the first tubular column group, wherein the third set direction is selected as: when the sample-added tubular column near the edge of the fixing plate in the second tubular column group or the first tubular column group is located in the first direction of the fixing plate, the set direction is the second direction, or when the sample-added tubular column near the edge of the fixing plate in the second tubular column group or the first tubular column group is located in the second direction of the fixing plate, the set direction is the first direction.

15. A micro-column gel card device comprising the micro-column gel card according to claim 1 and a sample adding mechanism configured for sample adding on the micro-column gel card, wherein the sample adding mechanism comprises a plurality of sample adding devices in a distribution and arrangement form adapted to a distribution and arrangement form of tubular columns on the micro-column gel card, and the sample adding mechanism has a freedom of motion in X, Y, and Z directions.

* * * * *